(12) United States Patent
Bauer et al.

(10) Patent No.: US 11,186,277 B2
(45) Date of Patent: Nov. 30, 2021

(54) ENERGY-OPTIMAL ADAPTIVE CRUISE CONTROLLER (71) Applicants: Peter H. Bauer, South Bend, IN (US); Eduardo F. Mello, South Bend, IN (US); Stephen F. Bauer, South Bend, IN (US)

(72) Inventors: Peter H. Bauer, South Bend, IN (US); Eduardo F. Mello, South Bend, IN (US); Stephen F. Bauer, South Bend, IN (US)

(*) Notice: Subject to any disclaimer, the term of this patent is extended or adjusted under 35 U.S.C. 154(b) by 182 days.

(21) Appl. No.: 16/574,608

(22) Filed: Sep. 18, 2019

(65) Prior Publication Data
US 2020/0108829 A1 Apr. 9, 2020

Related U.S. Application Data (60) Provisional application No. 62/743,119, filed on Oct. 9, 2018.

(51) Int. Cl.
*B60W 30/14* (2006.01)
*G05D 1/00* (2006.01)
*G08G 1/00* (2006.01)
*B60W 50/00* (2006.01)
*G08G 1/01* (2006.01)

(52) U.S. Cl.
CPC ........... *B60W 30/14* (2013.01); *B60W 50/00* (2013.01); *G05D 1/0088* (2013.01); *G08G 1/0125* (2013.01); *G08G 1/22* (2013.01); *B60W 2050/0052* (2013.01); *B60W 2400/00* (2013.01); *B60W 2720/106* (2013.01)

(58) Field of Classification Search
CPC ........................................... B60W 30/14
See application file for complete search history.

(56) References Cited

U.S. PATENT DOCUMENTS

| | | | | |
|---|---|---|---|---|
| 8,577,586 | B2 * | 11/2013 | Niki | G08G 1/22 701/118 |
| 8,930,115 | B2 * | 1/2015 | Filev | B60W 30/143 701/93 |
| 8,930,116 | B2 * | 1/2015 | Filev | B60K 31/00 701/96 |
| 10,017,179 | B2 * | 7/2018 | Alden | H04W 84/18 |
| 2019/0308624 | A1 * | 10/2019 | Borhan | B60W 30/188 |
| 2019/0378041 | A1 * | 12/2019 | Dhansri | G06N 20/00 |
| 2020/0108829 | A1 * | 4/2020 | Bauer | B60W 30/14 |

* cited by examiner

Primary Examiner — Michael A Berns
(74) Attorney, Agent, or Firm — Taylor IP, P C.

(57) ABSTRACT

An energy-optimal vehicle control system for at least one vehicle including a roadway data source configured for providing traffic and map data including at least one drive segment of the at least one vehicle, and an electrical processing system operably coupled with the roadway data source. The electrical processing system includes an optimizer for generating an energy-optimal speed profile for the at least one drive segment, and the electrical processing system is configured for controlling the speed of the at least one vehicle in accordance with the energy-optimal speed profile.

17 Claims, 9 Drawing Sheets

ENERGY-OPTIMAL ADAPTIVE CRUISE CONTROLLER

CROSS REFERENCE TO RELATED APPLICATIONS

This is a non-provisional application based upon U.S. provisional patent application Ser. No. 62/743,119, entitled "AN ENERGY-OPTIMAL ADAPTIVE CRUISE CONTROLLER FOR AUTONOMOUS ELECTRIC AND HYBRID-ELECTRIC VEHICLES", filed Oct. 9, 2018, which is incorporated herein by reference.

BACKGROUND OF THE INVENTION

1. Field of the Invention

The present invention relates to vehicles, and, more particularly, to an adaptive cruise controller for a vehicle.

2. Description of the Related Art

A modern vehicle may include self-driving software (and hardware) for automatically controlling the operation of the vehicle in a complete or partial manner. Some vehicles may be completely autonomous or self-driving. A typical self-driving vehicle (SDV) may include a control system that includes self-driving software and sensors that detect the location and/or surroundings of the SDV. The control logic within or associated with the SDV may thereby control the engine power, braking functionality, and steering of the SDV in response to the feedback signals of the sensors. Alternatively, some vehicles may be at least partially autonomous and include an adaptive, i.e. autonomous, cruise control system to assist the driver of the vehicle in a cruise control mode.

An adaptive cruise control system may generally include sensors for detecting other objects on the roadway, such as a leading vehicle in front of the driver's vehicle, and a control system coupled with the sensors for controlling one or more operating parameters of the vehicle. For example, the driver may turn on the adaptive cruise control system and set a specific speed of the vehicle, and then the adaptive cruise control system may vary the speed of the vehicle, by braking the vehicle or throttling engine power responsive to feedback signals from the sensors, in order to maintain a set distance from the leading vehicle.

However, some adaptive cruise control systems may lead to energy inefficiencies. For example, conventional cruise control systems may optimize instantaneous operating points of the engine or powertrain. In other words, these systems may only optimize various parameters one moment at a time without evaluating the entire speed trajectory or even several seconds into the projected speed trajectory. Additionally, if the leading vehicle drives erratically, i.e., with frequent speed variations, the host vehicle begins to mimic the bad driving behavior by continually decelerating and accelerating, which can lead to an undesirable driving experience. Hence, conventional cruise control systems may lead to suboptimal energy use of the vehicle and/or an unpleasant driving experience.

What is needed in the art is an energy efficient adaptive cruise controller.

SUMMARY OF THE INVENTION

The present invention provides an optimization system for at least one vehicle. The vehicle may be an electric or hybrid electric vehicle that is at least partially self-driving. The optimization system may include an adaptive cruise controller with a speed trajectory optimizer that generates an energy-optimal speed profile for one or more drive segments of the one or more vehicles. Thereby, the speed trajectory optimizer may reduce the transportation energy and cost of each vehicle that is equipped with the optimization system of the present invention. In the case of an electric vehicle, the speed trajectory optimizer may increase the battery life and range of the electric vehicle. The speed trajectory optimizer may generate an energy-optimal speed profile for a single vehicle or a platoon of vehicles.

The invention in one form is directed to a method for automatically controlling the speed of at least one vehicle. The method includes an initial step of providing a vehicle control system for the at least one vehicle. The vehicle control system includes a roadway data source configured for providing traffic and map data including at least one drive segment of the at least one vehicle, and an electrical processing system operably coupled with the roadway data source. The electrical processing system includes a speed controller and an optimizer operably connected to the speed controller. The method includes the further steps of generating an energy-optimal speed profile, by the optimizer, for the at least one drive segment, and communicating, by the optimizer, the energy-optimal speed profile to the speed controller in order to use the energy-optimal speed profile as a reference input for the speed controller. The method further includes the step of controlling the speed of the at least one vehicle, by the speed controller, in accordance with the energy-optimal speed profile.

The invention in another form is directed to a vehicle control system for at least one vehicle. The vehicle control system includes a roadway data source configured for providing traffic and map data including at least one drive segment of the at least one vehicle, and an electrical processing system operably coupled with the roadway data source. The electrical processing system includes an optimizer for generating an energy-optimal speed profile for the at least one drive segment. The electrical processing system is configured for controlling a speed of the at least one vehicle in accordance with the energy-optimal speed profile.

An advantage of the adaptive cruise controller of the present invention is that the cruise controller minimizes transportation energy and cost.

Another advantage of the adaptive cruise controller of the present invention is that the cruise controller may conserve energy usage and thereby increase the drivable range of an electric or hybrid electric vehicle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
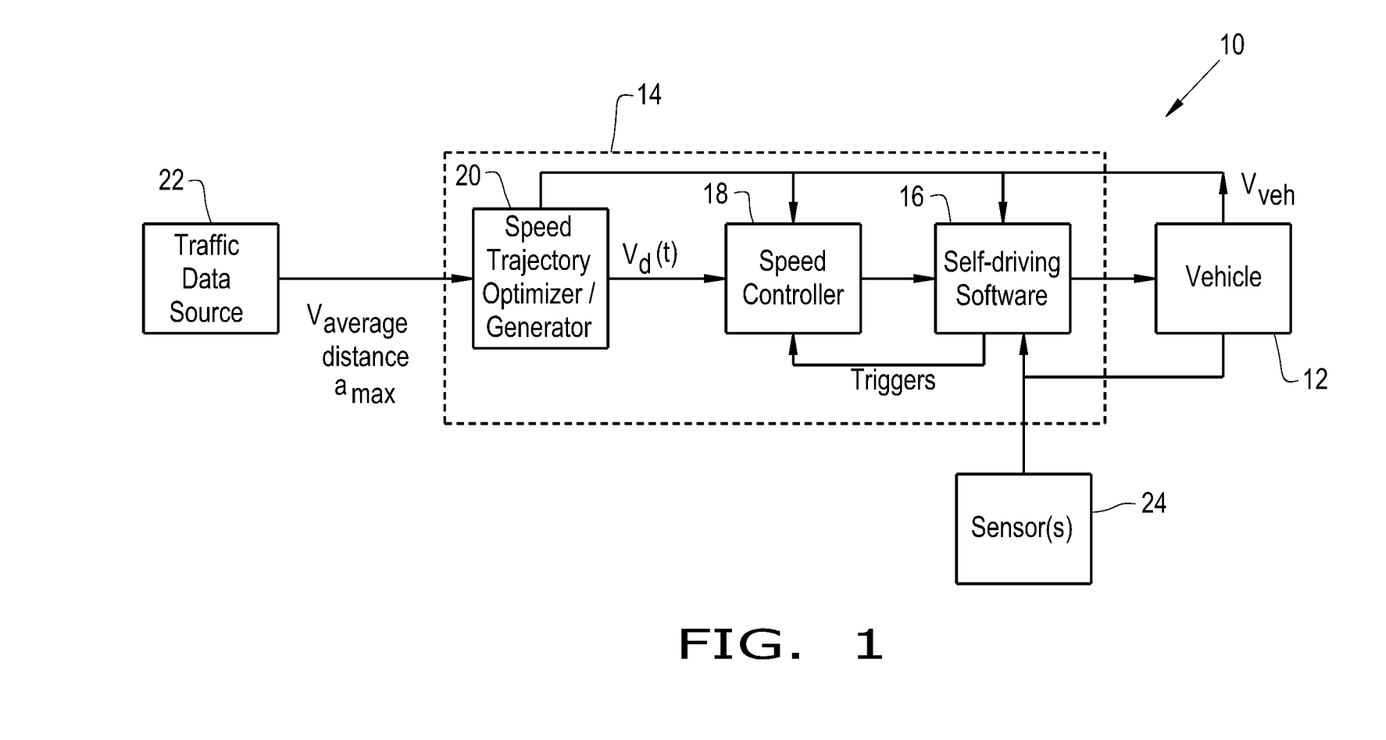
FIG. 1 is a block diagram of the vehicle and control system which includes the adaptive cruise controller of the present invention.

Referring now to the drawings, and more particularly to FIG. 1, there is shown a vehicle control system 10 which generally includes at least one vehicle 12, an electrical processing system 14 in the form of an adaptive cruise controller 14 that may include self-driving software 16, a speed controller 18, and a speed trajectory optimizer 20, a roadway data source 22, and at least one sensor 24. The vehicle system 10 may control the speed of one or more vehicles 12, in isolation or a platoon, in accordance with a generated energy-optimal speed profile or trajectory. The speed trajectory optimizer 20 provides a significantly lower energy solution and dynamic optimization to the operation of the vehicle(s) 12, especially for an electric vehicle (EV) or a hybrid electric vehicle (HEV), in highway, urban, sub-urban driving scenarios. In this regard, the speed trajectory optimizer 20 may minimize transportation energy, e.g. fuel or battery charge, reduce transportation cost, and maximize the range of the vehicle 12 during most driving scenarios.

The vehicle 12 may be in the form of any desired vehicle, such as a vehicle with a combustion engine, an EV, or an HEV. The vehicle 12 may be in the form of an automobile, a bus, a light rail system, a dedicated public transportation equipment, a truck, a semi, etc. The vehicle 12 may include self-driving software 16 which enables the vehicle 12 to be partially or completely autonomous. The vehicle 12 may be a partial or complete self-driving vehicle. Hence, the self-driving software 16 may include a conventional programming that operates the vehicle 12 in any desired manner, for example, for maintaining a vehicle speed and/or handling hazards and unexpected events. For example, the vehicle 12 may be a self-driving vehicle 12 with an autonomy level 3 and above. As shown, the vehicle 12 is in the form of a partial or complete self-driving EV or HEV. However, it should be appreciated that the vehicle 12 may or may not be a self-driving vehicle.

The electrical processing system 14 may be in the form of the energy-optimal adaptive cruise controller 14 which generally includes the self-driving software 16, the speed controller 18, the speed trajectory optimizer 20, and/or the traffic data source 22. As shown, the electrical processing system 14 includes the self-driving software 16, the speed controller 18, and the speed trajectory optimizer 20. The electrical processing system 14 receives situational awareness data from the roadway data source 22. The electrical processing system 14 may estimate the location of the next speed restriction to compute one or more drive segments or receive one or more drive segments from the roadway data source 22. As used herein, the term "drive segment" may include a portion of the roadway from one point to another point. For instance, the drive segment may also include a portion of the roadway in between consecutive speed constraints, e.g. speed bumps, stop lights, stop signs, curvatures in the roadway, or traffic jams. The electrical processing system 14 may compute and/or load an energy-optimal speed profile or trajectory via the speed trajectory optimizer 20, and may further execute the trajectory by controlling the speed of the one or more vehicles 12 in line with the energy-optimal speed profile. The electrical processing system 14 may also include a memory for storing any desired data concerning the vehicle 12, such as the type of vehicle, mass of the vehicle, dimensions of the vehicle, tire size, or even precomputed and stored optimal trajectories. The electrical processing system 14 may be in the form of any desired processor(s) and/or electronic control unit(s). The electrical processing system 14 may be integrated within the controller of the vehicle 12. It should be appreciated that the self-driving software 16, speed controller 18, speed trajectory optimizer 20, and the traffic data source 22 may be operably connected to one another by a wired or wireless connection. The connections in between the components 16, 18, 20, 22 may be virtual connections, for example as in the case of all being incorporated into the same processor or control unit, dedicated hardwired interfaces, or general bus or communications networks.

The speed controller 18 may control the speed of the vehicle 12 by controlling the braking system or motor power of the vehicle 12. The speed controller 18 may be in the form of any desired speed controller. For example, the speed controller 18 may be a simple proportional-integral-derivative (PID) controller that contains real-time control routines.

The speed trajectory optimizer 20 may be operably connected to the roadway data source 22, the speed controller 18, and/or the sensor(s) 24. The speed trajectory optimizer 20 receives data from the roadway data source 22 and provides an energy-optimal speed profile or trajectory for vehicle 12. In this regard, the speed trajectory optimizer 20 optimizes speed trajectories between consecutive speed constraints in the roadway, while taking constraints such as average expected speed, distance of the drive segment, maximum acceptable acceleration, and deceleration into account. The speed trajectory optimizer 20 then communicates this speed profile to the speed controller 18.

The speed trajectory optimizer 20 may precompute and store speed trajectories in a memory thereof or perform real-time calculations to compute the desired trajectory. The speed trajectory optimizer 20 may run standard optimization software, using e.g. the Python optimization libraries. The speed trajectory optimizer 20 may be incorporated into the existing hardware and/or software of the vehicle 12 or the speed trajectory optimizer 20 may be provided as a stand-alone processor unit. For example, the speed trajectory optimizer 20 may be a part of the autonomous driving software package running on a Nvidia® drive, using either a mixed optimization model, considering energy as the major component of the cost function, or using all other quantities of interest, such as driver comfort, minimum distance to the next vehicle, etc., as constraints while optimizing only energy. Alternatively, the space of optimal speed trajectories can be computed and sampled offline by a powerful external computing device and then loaded into the optimizer 20, making the onboard optimizer 20 more of a trajectory selector device. It should be appreciated that the speed trajectory optimizer may include or be in the form of a trajectory storage device.

The roadway data source 22 may include traffic and/or map data that includes situational awareness data of the roadway. The roadway data source 22 may provide at least one of the following: drive segment length, historic and/or real-time traffic data, stop signs or traffic lights distance information, speed limits, average expected speeds, typical acceleration or deceleration rates, accident locations, hazard locations, and/or any other piece of information on the current or next drive segment(s). The roadway data source 22 may be in the form of any desired data source. For example, the roadway data source 22 may be a known global positioning system (GPS) device incorporated as part of the vehicle 12 or as a separate in-car device, such as a Garmin® traffic device. Alternatively, the roadway data source 22 can be an Internet-based mapping service, such as Google Maps™, Apple Maps™, or WAZE®, which may be accessible by the vehicle 12 or a personal device, e.g. cell phone, of the driver or passenger.

The one or more sensors 24 may be operably coupled to any component of the electrical processing system 14. For instance, the sensor(s) 24 may be operably connected to the self-driving software 16 and/or speed controller 18. The one or more sensors 24 may be in the form of any desired sensor(s). For example, the sensor(s) 24 may be an optical sensor, a camera, an ultrasonic sensor, an auditory sensor, etc. It should be appreciated that the sensor(s) 24 may be integrated into the vehicle(s) 12.

Figure 2:
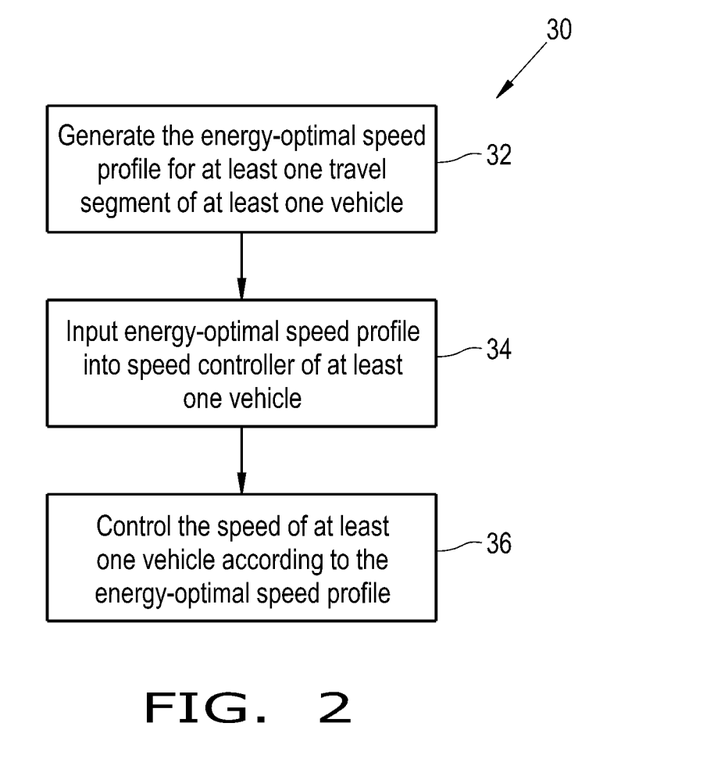
FIG. 2 is a flowchart of a method for operating the adaptive cruise controller of the present invention.
Figure 3:
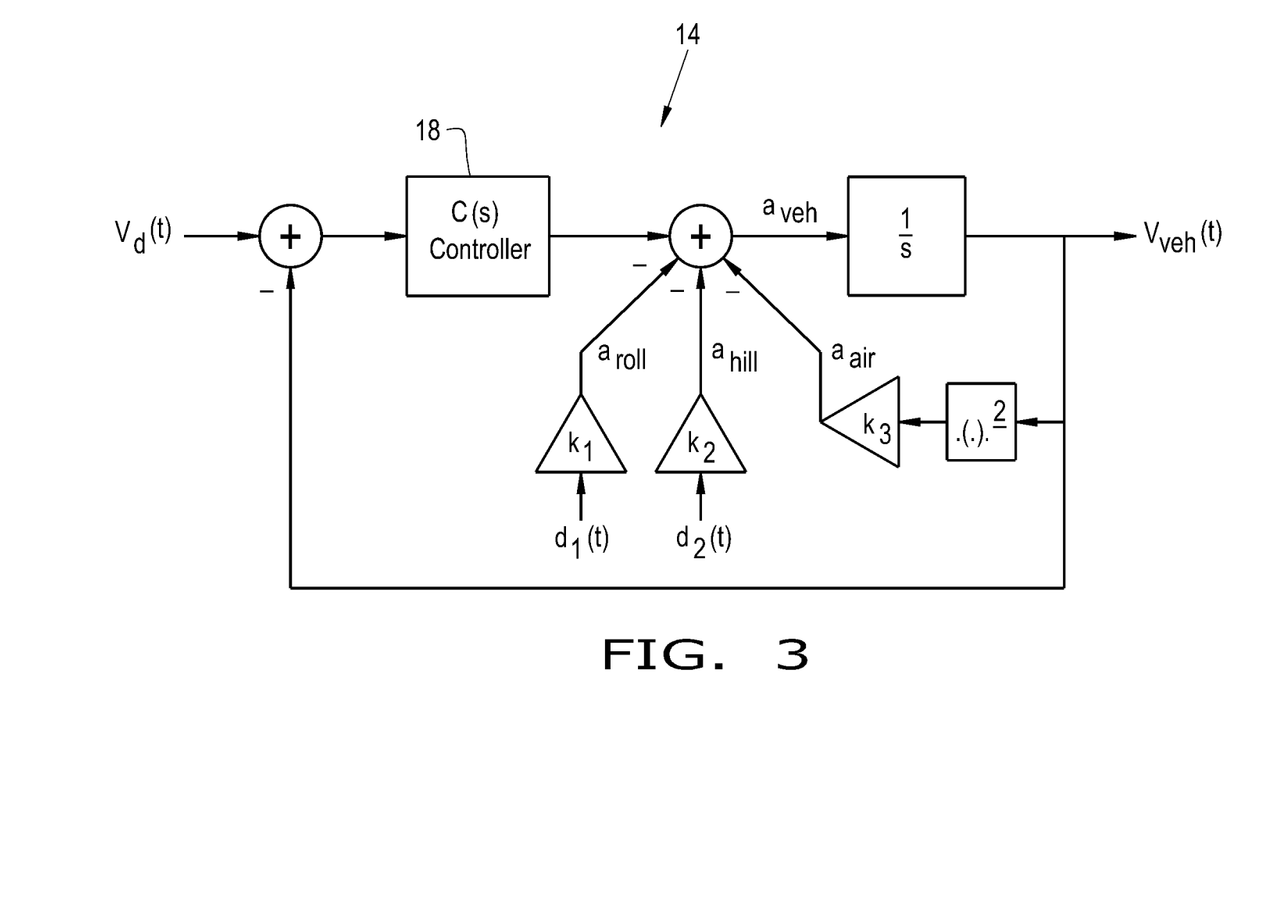
FIG. 3 is a block diagram of the model of the adaptive cruise controller.
Figure 4:
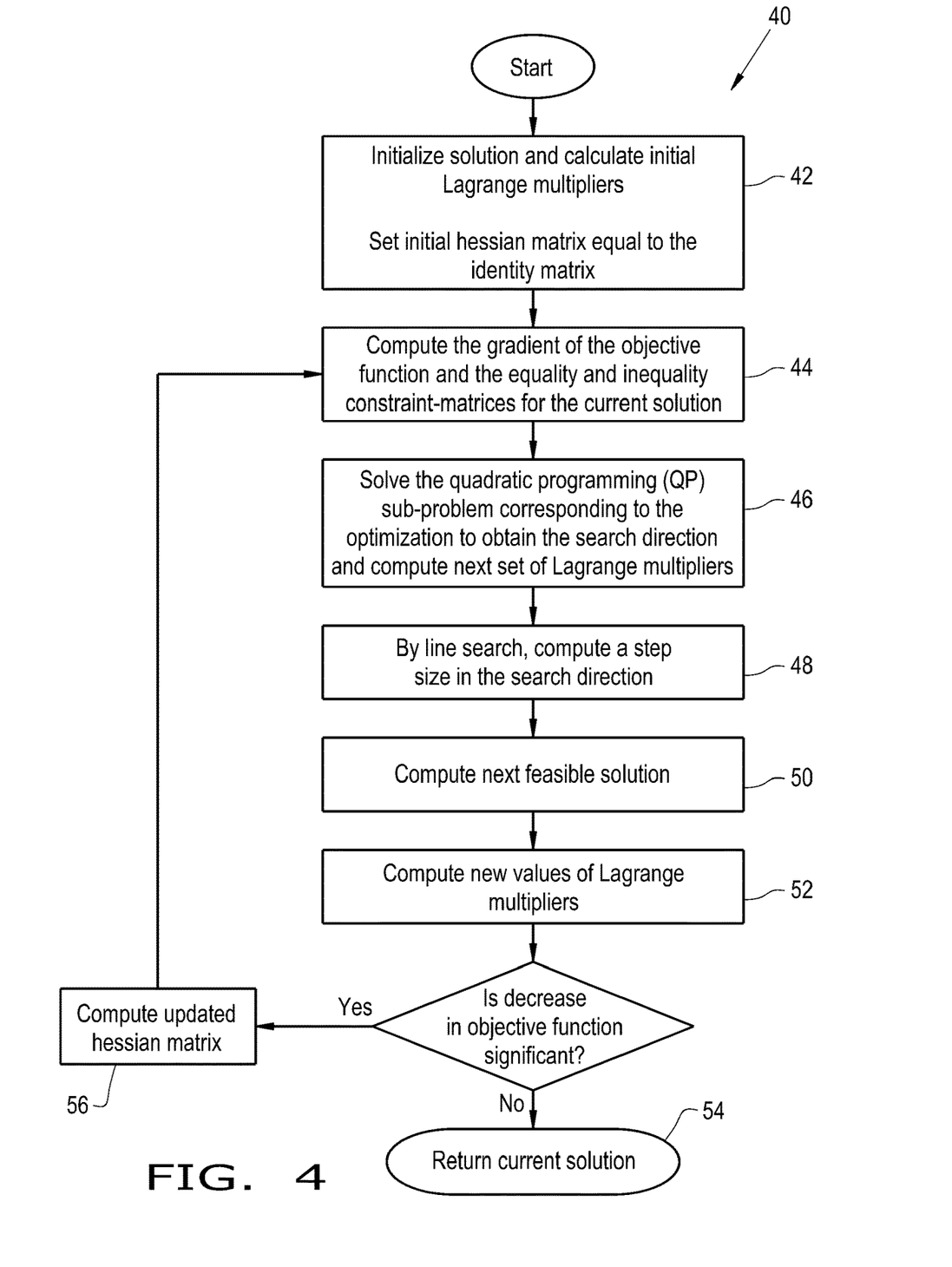
FIG. 4 is a flowchart of one possible method for generating an energy-optimal speed profile of at least one vehicle.
Figure 5:
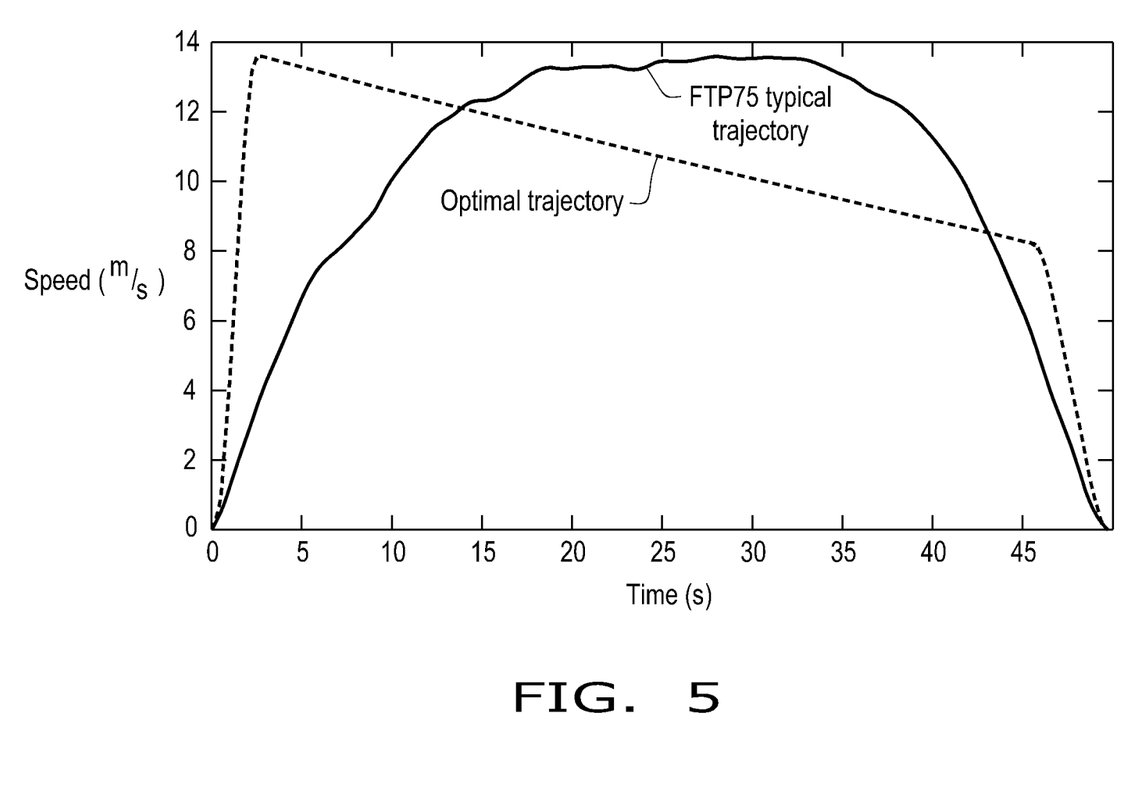
FIG. 5 is a graphical illustration of an energy optimal-speed profile verses a conventional speed trajectory.

Referring now to FIGS. 2-4, there is shown a method 30 for operating the energy-optimal adaptive cruise controller 14 for controlling the speed of one or more vehicles 12, in isolation or a platoon, in accordance with an energy-optimal speed profile, for example as shown in FIG. 5, which can be generated by any desired optimization model where energy is the dominant term in the cost function, for example the optimization model as shown in FIG. 4. The resulting speed of the one or more vehicles 12 may be generated by a control system of the electrical processing system 14 (FIG. 3).

The method 30 may include generating the energy-optimal speed profile by the speed trajectory optimizer 20 (at block 32). The energy-optimal speed profile may be calculated by the method 40, as discussed below. Next, the speed trajectory optimizer 20 may communicate the generated energy-optimal speed profile to the speed controller 18 in order to input the energy-optimal speed profile into the speed controller 18 (at block 34). Then, the speed controller 18 may control the speed of the vehicle(s) 12 in accordance to the energy-optimal speed profile (at block 36). After the speed controller 18 starts to implement the energy-optimal speed profile, the speed controller 18 and/or self-driving software 16 may alter the speed trajectory of the vehicle(s) 12 to avoid any unexpected events sensed by the sensor(s) 24.

The simulation model of the electrical processing system 14 may start with inputting the energy-optimal speed profile $V_d(t)$ into the speed controller 18. The total acceleration may include four major components: air drag $a_{air}$, rolling resistance $a_{roll}$, acceleration of mass and inertia, and/or hill climbing $a_{hill}$ (FIG. 2). The speed controller 18 may control the speed of the vehicle(s) 12, $V_{veh}(t)$, at the output by comparing this speed with the desired reference input speed. Speed controller 18 then takes the difference between desired speed $V_d(t)$ and actual vehicle speed $V_{veh}(t)$ and according to a control law with suitable tracking capability computes the desired controller output. Accelerations due to hill climbing, air drag and rolling resistance all subtract from the controller generated acceleration and the remaining net acceleration of the vehicle mass and inertia is then integrated in the 1/s block to compute the actual vehicle speed $V_{veh}(t)$. This speed in turn is used to compute the air drag term of the acceleration, which is proportional to the square of the speed. It is important to note that the speed controller 18 needs to be designed in such a way that the entire feedback system 14 tracks a step or a ramp input with zero error asymptotically. The simulation model may also use forward and reverse (regenerative braking) power-flow efficiencies, which can either be modeled as lumped efficiency or more accurately as efficiency maps of the powertrain. Constraints in the optimization may include acceleration limits, derivative of acceleration, speed limits, etc. The simulation model may also have the electrical processing system 14 track step signals, ramp signals, and/or feedback signals from the vehicle speed sensor or any other desired sensor(s) 24.

Referring now specifically to FIG. 4, there is shown one possible method 40 for generating the optimized speed profile, by the speed trajectory optimizer 20, for at least one drive segment. The initial Lagrange multipliers may be calculated and the initial hessian matrix may be set equal to the identity matrix (at block 42). Next, the gradient of the objective function and the constraint matrices for the current solution may be computed (at block 44). The quadratic programming (QP) sub-problem corresponding to the optimization to obtain the search direction may be solved, and the next set of Lagrange multipliers may be computed (at block 46). A step size in the search direction may be accordingly computed (at block 48). Then, the next feasible solution may be computed (at block 50). Then, new values of Lagrange multipliers may be computed (at block 52). If a decrease in objective function is not significant, then the method 40 may return the current solution (at block 54). If a decrease in objective function is significant, the method 40 may then compute the updated hessian matrix (at block 56). Then, the process will repeat by computing the gradient of the objective function (at block 44).

Figure 6:
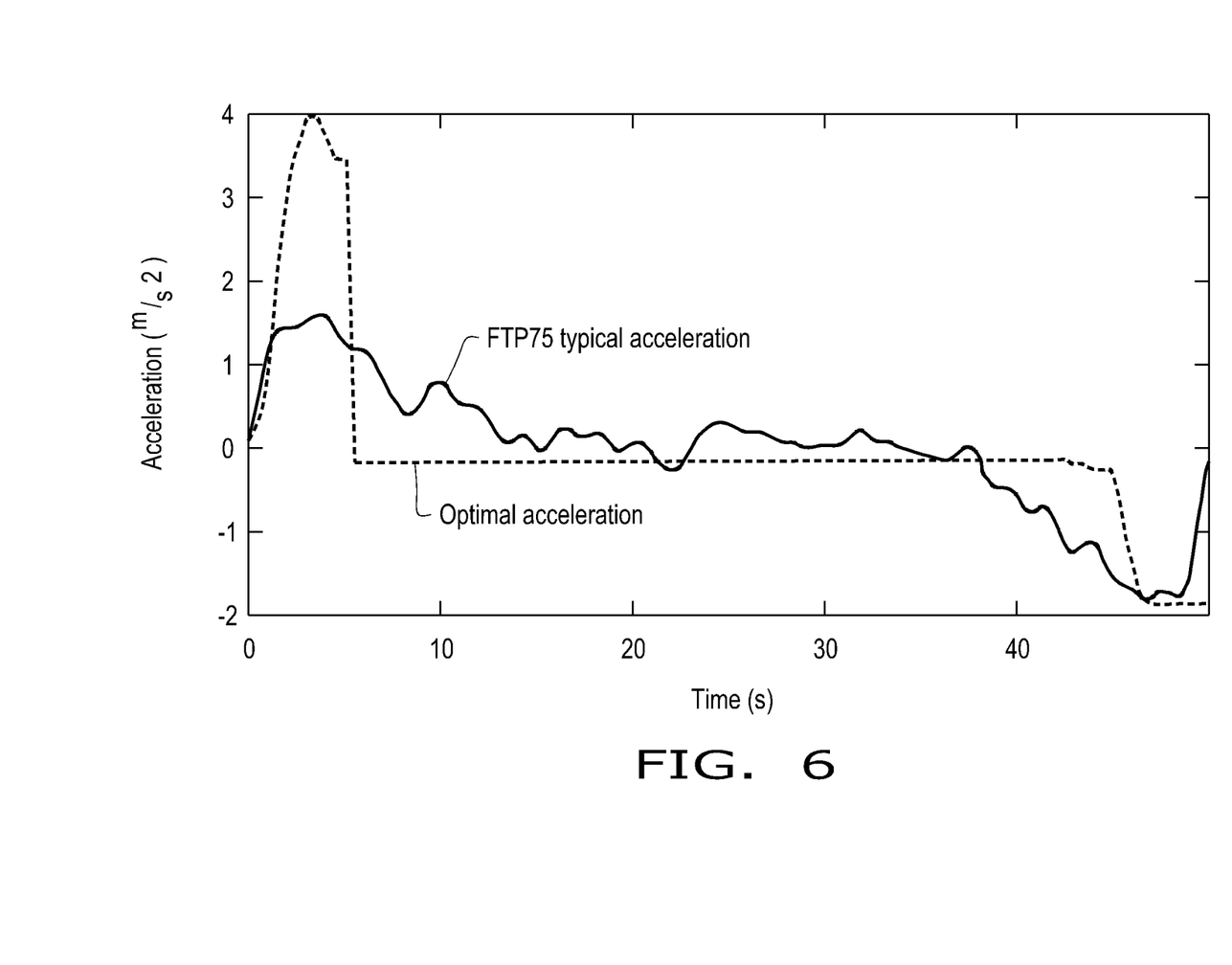
FIG. 6 is a graphical illustration of an energy optimal acceleration trajectory verses a conventional acceleration trajectory.
Figure 7:
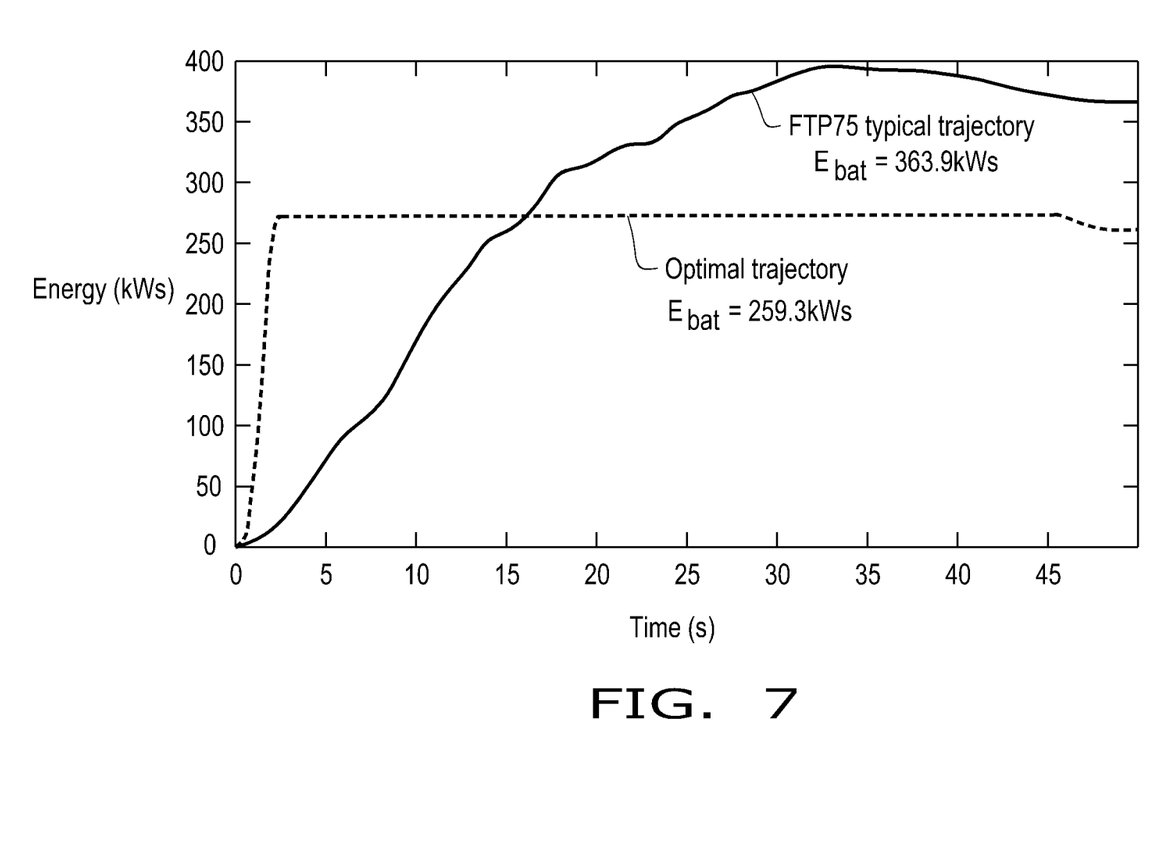
FIG. 7 is a graphical illustration of an energy optimal energy consumption trajectory verses a conventional energy consumption trajectory.

Referring now specifically to FIGS. 5-7, there is respectively shown the graphical illustrations of the energy-optimal speed trajectory in relation to a conventional or a typical trajectory with respect to speed (FIG. 5), acceleration (FIG. 6), and energy consumption of a single vehicle 12 (FIG. 7). The conventional trajectories of speed, acceleration, and energy were generated from averaged Federal Test Procedure (FTP) 75 drive cycle data and serves as a reference. For instance, a standard driving condition may include a scenario which is generated from stop-to-stop segments of a scaled and averaged FTP 75 urban drive cycle. On the other hand, the typical trajectory may be obtained from the traffic data source 22, which may provide typical executed speed trajectories for the optimized segment. The energy-optimal speed trajectory has an initially high onset of acceleration, which rapidly increases the speed by at least 1.5 m/s², as seen in at least FIG. 6, and it then ceases power which gradually decreases the speed of the vehicle 12. Then, when the vehicle 12 approaches the end of the drive segment, the energy-optimal speed trajectory rapidly decelerates the vehicle 12 by at least 1.5 m/s² (FIGS. 5-6). As compared to conventional FTP 75 drive cycle data, the energy-optimal speed trajectory of the present invention consumes 28.74% less total energy in the example shown, and most of the total energy is expended early in the drive segment (FIG. 7). Using this method energy savings can be as high as 60%.

Figure 8:
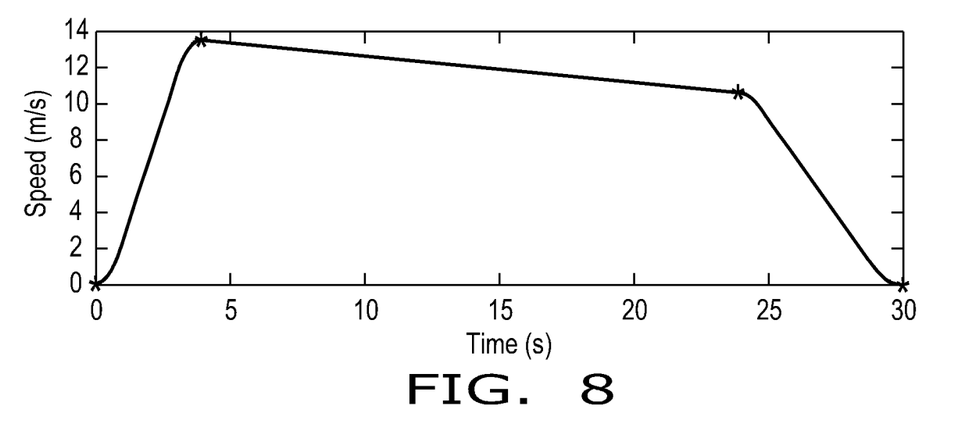
FIG. 8 is a graphical illustration of an optimal speed profile arising from one short segment and constant efficiency.
Figure 9:
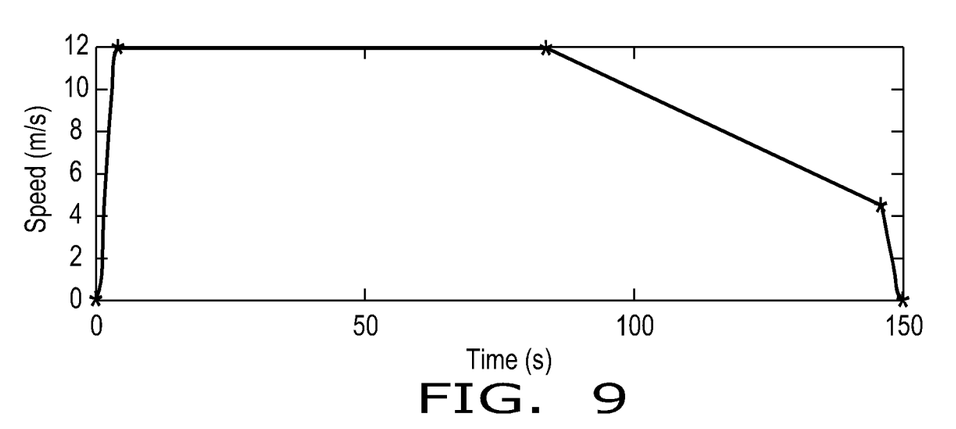
FIG. 9 is a graphical illustration of another optimal speed profile arising from a long segment and constant efficiency.
Figure 10:
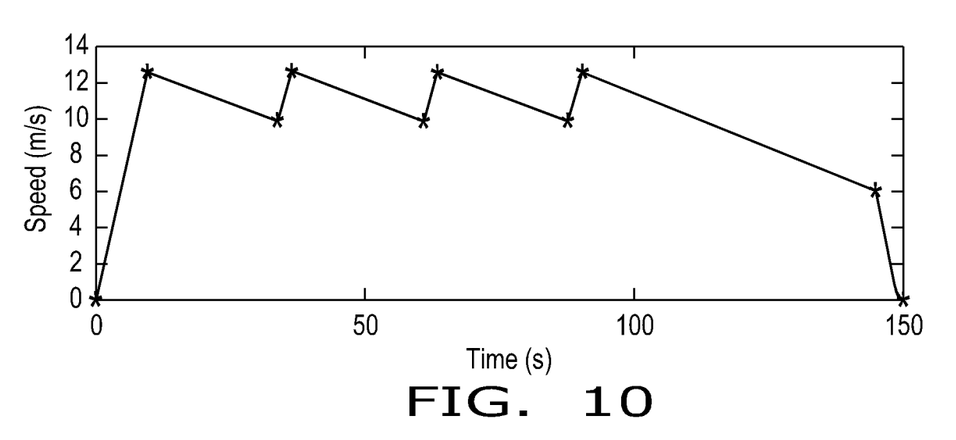
FIG. 10 is a graphical illustration of another optimal speed profile arising from long segments and a particular efficiency map with varying efficiency.

Referring now to FIGS. 8-10, there is respectively shown graphical illustrations of energy-optimal speed profiles for a single vehicle 12 which arise from different distance segment lengths and speeds. FIG. 8 illustrates a single drive segment and the corresponding energy-optimal speed profile of the vehicle 12 for a short distance over the course of 30 seconds with constant powertrain efficiency. Therein, a short energy optimal speed profile with jerk constraints consisting of three speed trajectory components is shown, with constant efficiency. FIG. 9 illustrates another drive segment with another energy-optimal speed profile of the vehicle 12 for a longer distance over the course of 150 seconds, also with constant powertrain efficiency. Therein, a long energy optimal speed profile with some jerk constraints consisting of four trajectory components is shown, also with constant efficiency. FIG. 10 illustrates an energy-optimal speed profile over the course of 150 seconds for a long segment length and large powertrain efficiency variations. Therein, a long energy optimal speed profile with no jerk constraints consisting of nine trajectory components is shown, with variable efficiency.

In more detail, and with respect to a single EV or HEV 12, the power and energy may, but not uniquely be calculated by the following equations. The power at the wheel $P_w$ of the vehicle 12 may be calculated for flat surfaces and zero wind speed by:

$$P_w(t) = mv(t)\dot{v}(t) + \tfrac{1}{2} C_d A \rho v^3(t) + mgf_r v(t)$$

The discretized energy at the wheel $E_{w,n}$, on a flat surface, may be calculated for a single time step by:

$$E_{w,n} = 0.5(m)(v_{n+1}^2 - v_n^2) + 0.5 C_d A \rho v_n^3 \Delta t + mgf_r v_n \Delta t$$

The discretized energy at the battery $E_{b,n}$ may be calculated by:

$$E_{b,n} = \begin{cases} \eta_{frw}(T,\omega)^{-1} E_{w,n} & \text{for } E_{w,n} \geq 0 \\ \eta_{reg}(T,\omega) E_{w,n} & \text{for } E_{w,n} < 0 \end{cases}$$

The total energy E may be calculated by:

$$E = \sum_{n=1}^{N} E_{b,n}$$

where m is the vehicle mass (including drivetrain inertia equivalent mass), v is the speed, $\dot{v}$ is the acceleration, $C_d$ is the drag coefficient, A is the projected frontal area, $\rho$ is the air density, g is the gravitational acceleration, $f_r$ is the coefficient of rolling resistance, $v_n$ is the discretized speed, $\eta_{frw}$ is the forward efficiency, $\eta_{reg}$ is the regenerative braking efficiency, T is the torque of the motor, $\omega$ is the rotational speed of the motor, $\Delta t$ is the time step size n is discrete time and N is the total number of time steps.

Figure 11:
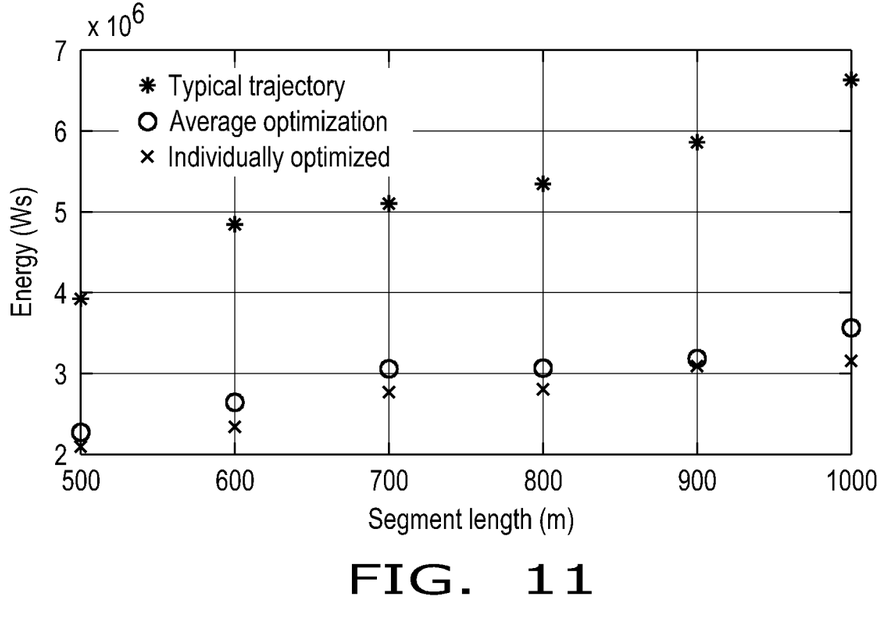
FIG. 11 is a graphical illustration comparing the energy expenditures over various segment lengths of an average optimization of an energy-optimal rigid platoon, an individually optimized floating platoon, and a conventional trajectory of a vehicle.
Figure 12:
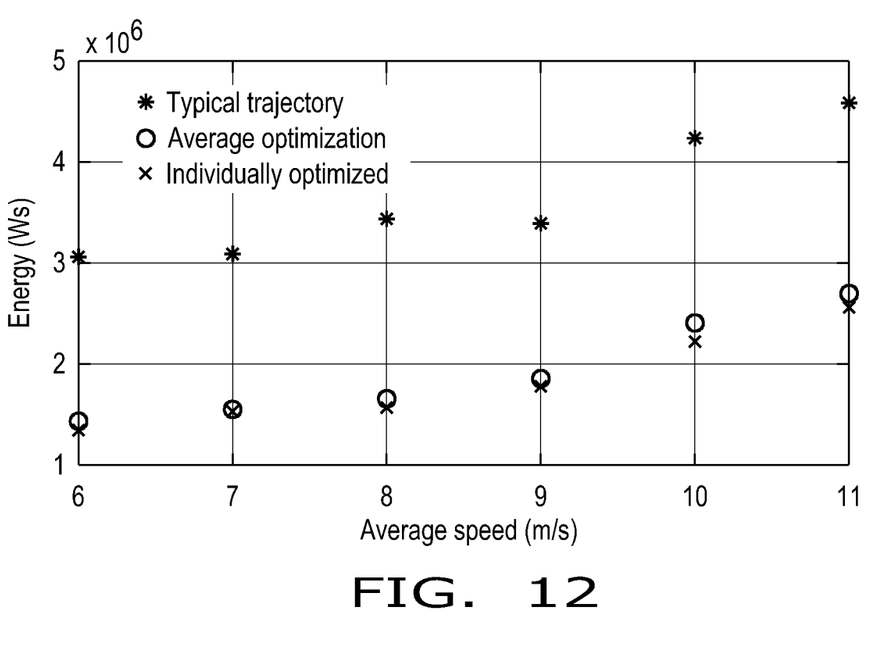
FIG. 12 is a graphical illustration comparing the energy expenditures over various average speeds of an average optimization of an energy-optimal rigid platoon, an individually optimized floating platoon, and a conventional trajectory of a vehicle.

Referring now to FIGS. 11-12, there is shown a graphical illustration comparing the energy expenditures over various segment lengths of an energy-optimized platoon, a platoon of individually optimized vehicles, and a platoon executing conventional vehicle trajectories (FIG. 11), and a graphical illustration comparing the energy expenditures over various average speeds of an average optimization of an energy-optimal platoon, an individually optimized platoon, and a conventional trajectory of a vehicle (FIG. 12). FIG. 11 shows the energy expenditures for short segments, e.g. 500 meters, and long segments, e.g. 1000 meters. Hence, FIG. 11 shows a platoon energy comparison of individual trajectory optimization in a floating platoon versus a common optimal trajectory based on the average vehicle characteristics as a function of segment length. FIG. 12 shows a platoon energy comparison as in FIG. 11, but as a function of average speed on the segment, with constant segment length. FIG. 12 also shows the energy expenditures for average speeds ranging from 6-11 m/s. It should be appreciated that only one, some, or all of the vehicles 12 of the platoon may include the vehicle control system 10, as discussed above.

The adaptive cruise controller 14, associated with one or each of the vehicles 12 of the platoon, may optimize the platoon by individually optimizing a respective speed profile for each individual vehicle 12, individually optimizing the lead vehicle 12 only, or by averaging parameters of the vehicles 12 and calculating one speed profile based on the average vehicle 12 of the platoon. For example, if the platoon is heterogenous, i.e., diverse in vehicle type, the adaptive cruise controller(s) 14 may generate an individual energy-optimal speed profile for each vehicle 12 based upon the unique characteristics of each vehicle 12. Alternatively, if the platoon is homogeneous, i.e., of the same type, or rigid, i.e., moving in unison, the adaptive cruise controller(s) 14 may generate a single energy-optimal speed profile for the platoon based upon the average vehicle 12. As can be appreciated, the manner of controlling platoon speeds may vary. One possible manner of controlling platoon speeds is by adaptive cruise control, which maintains a near constant following distance from one vehicle to the next. Thus, if the lead vehicle includes the speed controller 18 and speed trajectory optimizer 20 of the present invention, the platoon speed may thereby be controlled by actively controlling the lead vehicle and letting the adaptive cruise control keep the remaining platoon vehicles in line with the lead vehicle.

The averaged energy-optimal speed profile may be optimal for the platoon but may not be optimized exactly for each vehicle 12 because each vehicle 12 generally has a unique energy-optimal speed profile based upon its own data. Also, acceleration of the average vehicle of the platoon may be limited by the vehicle 12 with the lowest acceleration capabilities. In other words, the averaged energy-optimal speed profile may be similar to the individually calculated energy-optimal speed profile of the slowest vehicle 12 of the platoon. Even if the platoon is somewhat heterogeneous, e.g. a mix of different passenger cars, the averaged energy-optimal speed profile may still save a lot of transportation energy, and the energy expenditure thereof may only be slightly worse than if each vehicle 12 would have been individually optimized. Additionally, for example, the adaptive cruise controller 14 may calculate the averaged energy-optimal speed profile of the platoon because not every vehicle 12 of the platoon may have the adaptive cruise controller 14 of the present invention or be a level 4 or level 5 self-driving vehicle. A given platoon may also be compact which thereby may reduce congestion, and the averaged energy-optimal speed profile of the platoon may help reduce traffic queues at red lights.

The speed controller(s) 18 may control one or more vehicles 12 within the platoon. For instance, each speed controller 18 of each vehicle 12 within the platoon may receive and execute the calculated energy-optimal speed profile so that all of the platoon vehicles 12 carry out the speed profile in order to rapidly accelerate at the beginning of the trajectory and subsequently maintain or gradually decelerate thereafter (see also FIGS. 5-7). For long segments and large variations in the efficiency map, the gradual decrease in speed may be followed by several repeated instances of acceleration and coasting as shown in FIG. 10.

In more detail, the minimum total energy of a platoon may be calculated and optimized by the following equations. Each platoon vehicle 12 may be independently optimized, which may be the true optimal case. For EVs and/or HEVs, the single vehicle energy optimization, i.e., independent optimization, of platoon vehicles 12 may be expressed by the following energy optimization equation:

$$E = \min \sum_{n=1}^{N} E_{b,n}$$

$$\text{s.t.} \sum_{n=1}^{N} \frac{v_n}{N} = v_{avg}$$

$$0 \leq v_n \leq v_{max}$$

$$d_{max} \leq \frac{v_{n+1} - v_n}{\Delta t} \leq a_{max}$$

$$\forall n \in \{1, \ldots, n-1\}$$

$$d_{max} \leq \frac{-v_n}{\Delta t} <= a_{max} \text{ if } n = N$$

where $v_{avg}$ is the desired average speed, $v_{max}$ is the maximum speed allowed, $d_{max}$ is the maximum deceleration allowed, $a_{max}$ is the maximum acceleration allowed, $v_n$ is the discretized speed, $E_{b,n}$ is the discretized energy at the battery, N is the number of time segments, and $\Delta t$ is the time step. Thereby, the total transportation energy between stops or speed restricted zones is minimized by the above optimization equation. It should be appreciated that the optimization of total transportation energy may further include additional constrains. For instance, the optimization problem may include additional constraints on jerk and following distance between one platoon vehicle 12 and another platoon vehicle 12. The energy-optimal speed profile may accordingly be filtered to satisfy jerk and acceleration constraints; thus, making the trajectory more pleasant and smooth for passengers.

A rigid platoon may be collectively optimized by the following energy optimization model, which may not incorporate the reduced air drag effect:

$$E_p = \sum_{m=1}^{M} E_m$$

$$E_p = \sum_{n=1}^{N} \left( \left( \sum_{m=1}^{M} \alpha_m \right) (v_{n+1}^2 - v_n^2) + \left( \sum_{m=1}^{M} \beta_m \right) v_n^3 \Delta t + \left( \sum_{m=1}^{M} \gamma_m \right) v_n \Delta t \right) \eta_n$$

wherein $$\alpha_m = \frac{m_m}{2}, \beta_m = \frac{1}{2} C_{d,m} A_m \rho, \gamma_m = m_m g f_{r,m}$$

$$E_{avg} = \frac{E_p}{M} = \sum_{n=1}^{N} \left( \frac{A}{M}(v_{n+1}^2 - v_n^2) + \frac{B}{M} v_n^3 \Delta t + \frac{C}{M} v_n \Delta t \right) \eta_n$$

wherein $$A = \sum_{m=1}^{M} \alpha_m, B = \sum_{m=1}^{M} \beta_m, C = \sum_{m=1}^{M} \gamma_m$$

and further where $E_m$ is the energy of the m-th vehicle, $E_p$ is the energy of the platoon, M is the number of vehicles in the platoon, A/M is the average vehicle kinetic energy constant, B/M is the average vehicle air drag constant, C/M is the average vehicle friction constant, $\alpha_m$, $\beta_m$, $\gamma_m$ are vehicle constants wherein A, B, C are the summation thereof, $v_n$ is the discretized speed (equal for every vehicle), $E_{avg}$ is the discretized energy at the battery, and $\eta_n$ is the efficiency coefficient.

The following energy optimization model may express the rigid platoon case using the average vehicle model:

$$E_{w,n}M = [A(v_{n+1}^2 - v_n^2) + Bv_n^3 \Delta t + Cv_n \Delta t] \eta(T, \omega)$$

$$E_{b,n}M = \begin{cases} \eta_{frw}(T, \omega)^{-1} E_{w,n}M & \text{for } E_{w,n} \geq 0 \\ \eta_{reg}(T, \omega) E_{w,n}M & \text{for } E_{w,n} < 0 \end{cases}$$

$$E = \min \sum_{n=1}^{N} E_{b,n} M$$

$$\text{s.t.} \sum_{n=1}^{N} \frac{v_n}{N} = v_{avg}$$

$$0 \leq v_n \leq v_{max}$$

$$d_{max} \leq \frac{v_{n+1} - v_n}{\Delta t} \leq a_{max}$$

$$\forall n \in \{1, \ldots, N-1\}$$

$$d_{max} \leq \frac{-v_n}{\Delta t} <= a_{max} \text{ if } n = N$$

As can be appreciated the energy savings may be dependent on the types of vehicle(s) 12 which constitute the platoon. Furthermore, energy savings may be seen when individually optimizing each vehicle or by optimizing for an average vehicle in the platoon. Optimizing for an average vehicle in the platoon results in around 4% difference in energy savings as compared to optimizing each platoon vehicle individually for typical urban speeds. Hence, the energy savings between individually optimized trajectories and the average vehicle trajectory may be similar. In either case, the energy optimization of the present invention may result in energy savings of more than 40% as compared to a conventional vehicle trajectory.

In urban and sub-urban driving scenarios, when ignoring parasitic losses, the optimization system may lead to a 20-50% improvement in efficiency of energy consumption of the vehicle 12 as compared to standard driving conditions of conventional EVs and HEVs with conventional (non-optimal) control systems. As can be appreciated, the increase in efficiency may be impacted by various characteristics of the traffic or vehicle, stop-to-stop segment length, average speed, etc. Furthermore, the speed trajectory optimizer 20 may save more energy in short segments (<1 km) than long segments (>2 km), depending upon the average speed.

Conventional systems do not work optimally because such systems do not consider the entire speed trajectory and given constrains, i.e., situational awareness is not considered. Hence, conventional systems only consider instantaneous information for optimizing engine efficiency. Additionally, for long distance travel, conventional eco-routing systems do not consider dynamical speed changes on a time scale of milliseconds or second, i.e., optimizing acceleration or deceleration, as in the present invention.

The optimization model of the present invention is a power-flow model that captures efficiencies as a function of the operating point in, for example, the torque versus speed diagram. If the efficiency map is relatively flat, a lumped efficiency model already can provide good results, yet an accurate efficiency map may be more desirable. If instead of a lumped efficiency model one uses an efficiency map, e.g. in the torque versus speed space, then even larger improvements may be possible in the case of significant efficiency variations in the powertrain system. Also, the proposed system provides speed trajectory control that can produce efficient transportation systems, especially in applications with large and frequent speed variations. The optimization model of the present invention provides a constrained optimization which results in a speed verses time trajectory that is energy optimal given average speed and other constraints. In theory, the optimization model of the present invention may provide the most energy efficient speed trajectory of at least one vehicle, given certain constraints, vehicle data, and assuming the perfect execution of the speed trajectory.

The method of the present invention accordingly provides large efficiency gains in electric drives by way of exploiting self-driving capabilities and situational awareness. The self-driving capabilities of the vehicle may ensure exact execution of the optimal speed profile. The situational awareness of the vehicle may inform the system of various traffic situations and how to accordingly choose various driving parameters. The large efficiency gains may generally only be possible if the cost function is related to transportation energy only, with all other conditions needing to be formulated as constraints. Hence, the resulting speed trajectories are key to energy savings and efficiency gains. For optimizing a platoon of vehicles, the energy savings and efficiency gains from the case of a single vehicle can be translated to urban platoons, such as urban platoons that are fairly homogenous, for example a platoon of only passenger vehicles or trucks.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for automatically controlling the speed of at least one vehicle, comprising:
providing a vehicle control system for the at least one vehicle, the vehicle control system includes a roadway data source configured for providing traffic and map data for a drive cycle including a plurality of drive segments for the at least one vehicle, and an adaptive cruise controller operably coupled with the roadway data source and including a speed controller;
generating an energy-optimal speed profile, by the adaptive cruise controller, for the drive segments;
communicating the energy-optimal speed profile to the speed controller in order to input the energy-optimal speed profile as a reference input for the speed controller; and
controlling the speed of the at least one vehicle, by the speed controller, in accordance with the energy-optimal speed profile over the drive cycle, the energy-optimal speed profile minimizing a total transportation energy of the at least one vehicle in the drive segments, each drive segment being selected as being between stops and/or speed restricted zones derived from the roadway data source.

2. The method of claim 1, wherein the step of generating the energy-optimal speed profile includes at least one of computing the energy-optimal speed profile in real-time and loading a precomputed energy-optimal speed profile.

3. The method of claim 1, wherein the step of controlling the speed of the at least one vehicle includes accelerating the at least one vehicle at a beginning of the drive segment by at least 1.5 m/s², ceasing acceleration which gradually decreases the speed of the at least one vehicle by coasting, and decelerating the at least one vehicle by at least 1.5 m/s² at an end of the at least one drive segment.

4. The method of claim 1, wherein the electrical processing system further includes self-driving software for the at least one vehicle, and the at least one vehicle includes at least one sensor and the electrical processing system is configured for being operably coupled to the at least one sensor.

5. The method of claim 4, further comprising a step of altering the speed of the at least one vehicle, by the adaptive cruise controller, for avoiding any unexpected events sensed by the at least one sensor.

6. The method of claim 1, wherein the at least one vehicle is one of an electric vehicle and a hybrid electric vehicle.

7. The method of claim 6, wherein a total energy E of the vehicle is calculated by:

$$E = \sum_{n=1}^{N} E_{b,n},$$

wherein a discretized energy at the battery of the vehicle $E_{b,n}$ is calculated by:

$$E_{b,n} = \begin{cases} \eta_{frw}(T, \omega)^{-1} E_{w,n} & \text{for } E_{w,n} \geq 0 \\ \eta_{reg}(T, \omega) E_{w,n} & \text{for } E_{w,n} < 0 \end{cases},$$

wherein $\eta_{frw}(T, \omega)$ is a forward efficiency of the drive train, $\eta_{reg}(T, \omega)$ is a regenerative efficiency of the drivetrain, T is torque, $\omega$ is a rotational speed, and $E_{w,n}$ is discretized energy at the wheel, on a flat surface, calculated by:

$$E_{w,n} = 0.5(m)(v_{n+1}^2 - v_n^2) + 0.5 C_d A \rho v_n^3 \Delta t + mg f_r v_n \Delta t,$$

and further wherein m is vehicle mass, $v_n$ is discretized speed of the vehicle at an nth time instant, $C_d$ is a drag coefficient of the vehicle, A is a frontal area, $\rho$ is air density, g is gravitational acceleration, $f_r$ is a coefficient of rolling resistance, and $\Delta t$ is a time step.

8. The method of claim 7, wherein the total transportation energy between stops or speed restricted zones is minimized as follows:

$$\min \sum_{n=1}^{N} E_{b,n}$$

$$\text{s.t.} \quad \sum_{n=1}^{N} \frac{v_n}{N} = v_{avg}$$

$$0 \leq v_n \leq v_{max}$$

$$d_{max} \leq \frac{v_{n+1} - v_n}{\Delta t} \leq a_{max}$$

$$\forall n \in \{1, \ldots, N-1\}$$

$$d_{max} \leq \frac{-v_n}{\Delta t} <= a_{max} \text{ if } n = N$$

where $v_{avg}$ is a desired average speed, $v_{max}$ is a maximum speed allowed, $d_{max}$ is a maximum deceleration allowed, $a_{max}$ is a maximum acceleration allowed, $v_n$ is a discretized speed, $E_{b,n}$ is a discretized energy at the battery, N is a number of time segments, and $\Delta t$ is a time step.

9. The method of claim 8, wherein the optimization of total transportation energy further includes additional constraints of jerk and following distance between one platoon vehicle and another platoon vehicle of a platoon of vehicles.

10. The method of claim 8, wherein the energy-optimal speed profile is filtered to satisfy jerk and acceleration constraints.

11. The method of claim 1, wherein the at least one vehicle is in the form of a platoon of vehicles.

12. The method of claim 11, wherein a total energy E of the platoon of vehicles is minimized by independently optimizing each platoon vehicle energy by generating a respective energy-optimal speed profile.

13. The method of claim 11, wherein a total energy E of the platoon of vehicles is minimized by averaging driving parameters of the vehicles within the platoon of vehicles and calculating a single energy-optimal speed profile for the platoon of vehicles.

14. A vehicle control system for at least one vehicle, comprising:
 a roadway data source configured for providing traffic and map data for a drive cycle including a plurality of drive segments of the at least one vehicle; and
 an adaptive cruise controller operably coupled with the roadway data source for generating an energy-optimal speed profile for the drive segments, and the adaptive cruise controller controlling a speed of the at least one vehicle in accordance with the energy-optimal speed profile, the energy-optimal speed profile minimizing a total transportation energy of that at least one vehicle in the drive segments, each drive segment being selected as being between stops and/or speed restricted zones derived from the roadway data source.

15. The vehicle control system of claim 14, wherein the at least one vehicle includes at least one sensor and the adaptive cruise controller is configured for being operably coupled to the at least one sensor.

16. The vehicle control system of claim 14, wherein the adaptive cruise controller generates the energy-optimal speed profile by either computing the energy-optimal speed profile in real-time or loading a precomputed energy-optimal speed profile, or a combination of the two.

17. The vehicle control system of claim 14, wherein the roadway data source provides each drive segment, typical acceleration data, average travel speed for each drive segment, and a speed limit of each drive segment.

* * * * *